Feb. 13, 1951     B. B. HOLMES     2,541,765
AUTOMATIC STEERING DEVICE FOR DIRIGIBLE CRAFT
Filed June 10, 1947     4 Sheets—Sheet 1

Inventor
Bradford B. Holmes
Dodge and Sons
Attorneys

Feb. 13, 1951     B. B. HOLMES     2,541,765
AUTOMATIC STEERING DEVICE FOR DIRIGIBLE CRAFT
Filed June 10, 1947     4 Sheets-Sheet 2

Inventor
Bradford B. Holmes

Attorneys

Feb. 13, 1951 B. B. HOLMES 2,541,765
AUTOMATIC STEERING DEVICE FOR DIRIGIBLE CRAFT
Filed June 10, 1947 4 Sheets-Sheet 4

Inventor
Bradford B. Holmes

Attorneys

UNITED STATES PATENT OFFICE 2,541,765

AUTOMATIC STEERING DEVICE FOR DIRIGIBLE CRAFT

Bradford B. Holmes, New York, N. Y.

Application June 10, 1947, Serial No. 753,774

16 Claims. (Cl. 114—144)

The present invention relates to automatic steering systems for dirigible craft and is in the nature of an improvement on the methods and apparatus described and claimed in prior patents granted to me.

From the method standpoint there is a peculiarly important improvement over the disclosure in the patent to Holmes 2,095,031, issued October 5, 1937. The mechanism used according to the present invention is of the follow-up type. A course selecting head associated with a compass or the equivalent periodically closes selected electrical circuits, one of which is a centering circuit effective when the ship is on its course and the others of which are corrective circuits normally open at the selector head but periodically closed selectively as the craft swings farther and farther from its course. The closing of any circuit at the selector head (other than the centering circuit) actuates a relay switch mechanism which causes the steering motor to move the rudder in a corrective direction. The extent of such motion is determined by a controller which is turned in a definite relation to rudder motion and stops the steering motor by breaking the circuit when the rudder has been appropriately displaced. As the ship returns to course, the motor is run in the opposite direction with the result that the rudder is returned toward and then to its neutral position. Important features of the invention have to do with the action of the controller.

Before proceeding with a discussion of the present invention, it is desirable to define certain terms which will be used throughout the present specification. The normal neutral position of the rudder is that position which will cause the craft to follow a straight course in the absence of wind, at normal trim, and normal speed. Corrected neutral position of the rudder is that position which causes the craft to follow a straight course under existing conditions of wind, speed and trim, each of which is a variable disturbing factor. The unqualified term neutral position is used generically to indicate the neutral position assumed then to be in effect whether normal or corrected.

The terms applying and removing rudder indicate respectively moving the rudder from and toward neutral position. Rudder increment refers to the amount (angle) that rudder is applied by closure of a given circuit at the selector head. The term natural damping refers to the inherent directional stability of the craft while rudder damping refers to the effect of the rudder in checking a swing of the craft, when the rudder is 'removed" wholly or partially while the swing caused by a rudder application persists.

For purpose of description and without implying necessary limitations thereto, the invention is shown embodied in a form in which the manual steering gear actuates a quadrant, and the motor of the automatic steerer reacts between the quadrant and the rudder post. With such an arrangement the hand-actuated steering wheel is set in centered position when the automatic steerer is to be operated.

According to the present invention, the controller is modified so that the pattern of rudder application in response to departure from the course is different from and wholly independent of the pattern of rudder removal in response to the return of the craft to the course. Each pattern may be modified independently of the other to respond to characteristics inherent in the design of the ship. In this way a rudder pattern suitable to the steering characteristics of the ship can be established. For example, in the embodiment illustrated there is on each side of the neutral contact in the selector head a first increment contact which produces a very moderate rudder motion and is used to hold the ship on course under favorable sea conditions. Beyond the first increment contact on each side is a second increment contact and then a third increment contact. These function in automatic steering. Beyond the third increment contact is a fourth contact which extends through a considerable arc and, though it can function in automatic steering, is intended primarily for use in changing course. This fourth contact when closed causes the motor to move the rudder to the extreme limit used in automatic steering.

According to the illustrated embodiment of the invention, a rotatable element of the controller carries the main contact segments and is driven directly from the rudder post. However, it can be driven by any member which partakes of the same or accurately related motion. A direct mechanical connection with the rudder post is considered preferable wherever it can be had, because all possibility of false motion is then eliminated. The connection just mentioned is such that when the rudder is at and near its normal neutral position, the rotary element of the controller is turned by it at the maximum angular rate as compared to the angular rate of the rudder post, but this disparity of rate diminishes toward the limit of motion in each direction. As a practical matter, the controller cannot turn quite 90 degrees, whereas the maximum desirable degree of motion of the rudder in each direction of application is about 35 degrees. A significant fact concerning the variable relative motion is that the rudder and the controller reach their limiting positions substantially simultaneously. A pin and slot connection with a motion amplifying gear train is the preferred connection between the rudder post and the controller but various equivalent mechanisms can be devised.

Coacting with the contact segments in the rotatable element of the controller are two sets of brushes. Those of the first set control the extent of rudder motion while applying rudder. The positions of these brushes determine the angles through which the rudder must turn before the motor circuit is opened. These brushes are individually adjustable. Their adjustment determines the pattern for rudder application. The brushes of the second set are independently adjustable and control certain of the circuits while the motor is running to return the rudder to neutral position and limit the returning motor.

The controller includes a selector switch which shifts in response to reversal of direction of rotation of the controller. When rudder is being applied, the controller turns in one direction, and when this rudder is being removed, it turns in the opposite direction. At the moment of reversal, after rudder has been applied, the controller shifts the selector through a small angle to substitute brushes of the second set for corresponding brushes of the first set. This use of separate brushes for the two functions of applying and removing rudder affords complete independence in the characteristics of rudder removal as compared with rudder application. The adjustability of the brushes permits the device to be set for the characteristics of the ship in applying rudder, and to be set for the different characteristics encountered in removing rudder.

As a general rule, the only factor which materially modifies the response characteristics of a ship is the loading or trim of the ship. Experience indicates that the changes so produced are not so great as to prevent satisfactory operation with a single adjustment of each of the two sets of brushes. As a general rule, that adjustment of the brushes which is best for a loaded condition is satisfactory for an unloaded condition.

Another feature of the invention is a simple mechanism which causes the device to establish a corrected neutral position of the rudder which is appropriate for the inherent characteristics of the ship modified by the contemporaneous disturbing effect of wind, speed and trim. This corrected neutral position is variable because the contemporaneous factors just mentioned are each subject to change. The result is secured by displacing the controller element by a uniform and practically imperceptible amount in the direction of rudder application each time the rudder is applied. For example, if the ship repeatedly falls off her course to the right, there will be an integrated countervailing adjustment of the neutral position of the rudder to the left. This adjustment of neutral position ceases when the departures from course in one direction are numerically equal to the departures from course in the opposite direction.

The most important aspect of this corrective function is that the total departure of this automatically established corrected neutral position from the normal neutral position of the rudder is positively limited. This limitation is important because it prevents serious derangement of the corrected neutral position by a series of changes of course made successively in the same direction. It should also be observed that the minute correction is fixed in amount for each rudder movement irrespective of the amplitude of the rudder movement. Consequently large course changes do not enlarge the corrective adjustment.

A third feature of the invention is a provision of means to disable the first contact on each side of the neutral contact in the controller. This changes the sensitivity of the system. It has been proposed heretofore to change the sensitivity of control in an automatic steerer but this was done by widening the control band. According to the present invention, the control band is not widened. The effect is simply to suppress the small rudder increments produced by the middle contacts without changing the rudder increments produced by the remaining contacts. Thus the device has a middle zone in which it is unresponsive to changing course, but if the craft departs from course in a greater degree, the response of the rudder is the same as it would have been had the sensitivity not been reduced.

To explain the desirability of this arrangement, it may be remarked that a serious defect in any automatic steerer is continuous or too frequent operation of the steering mechanism. There are certain conditions, for example those incident to a heavy, quartering or following sea, which cause a "false yaw" (i. e., a cyclic swinging motion) without actually causing the ship to depart substantially from course. If the steering mechanism functioned in an effort to stop these false yaws, the effort would be wholly ineffectual, would be wasteful of power, and would involve objectionable wear on the apparatus. The effect of the arrangement described is to prevent the automatic steerer from responding within the range of the false yaw but to produce a sharp rudder response (not merely the normal first increment) if that range is exceeded.

A fourth feature of the invention is an arrangement which causes the steering motor to move the rudder to corrected neutral position as soon as the control switch is moved to "off" position. Suppose that a ship is approaching port under automatic control and a decision is made to cut out the automatic control while the ship is turning. In prior art devices the automatic steering mechanism would remain in whatever position it might be at that time. According to the invention, the act of cutting out the automatic steerer causes the motor to run until the rudder is properly centered with reference to the quadrant and then stop. As a consequence, the act of cutting out automatic steering establishes the correct, centered relationship between the hand steering mechanism and the rudder. This is important for hand steering, and also for any subsequent resumption of automatic steering.

The invention will now be described as used with a system in which the manually actuated steering mechanism shifts a quadrant mounted on the rudder post, and the automatically controlled steering motor reacts between the quadrant and the rudder post. With such a system the hand steering mechanism is set to establish normal neutral position of the rudder, preparatory to automatic steering, and the steering motor then turns the rudder post relatively to the quadrant.

The quadrant, cables and steering wheel are held stationary against the reaction of the rudder by a friction brake at the steering wheel.

Such an arrangement is commonly used in the art and is selected as typical, but with express recognition of the fact that the automatically controlled steering motor can be applied to effect steering in any other of the various ways such motors are used in the automatic steering art. The invention is concerned primarily with the way the motor is controlled. The arrangement by which the motor actuates the rudder, or pilots some steering engine which actuates the rudder, may be selected from a variety of well-known arrangements, to meet conditions imposed by the particular installation. It is preferred to operate the controller directly from the rudder post wherever this is conveniently possible.

Figures 6, 7, 8:
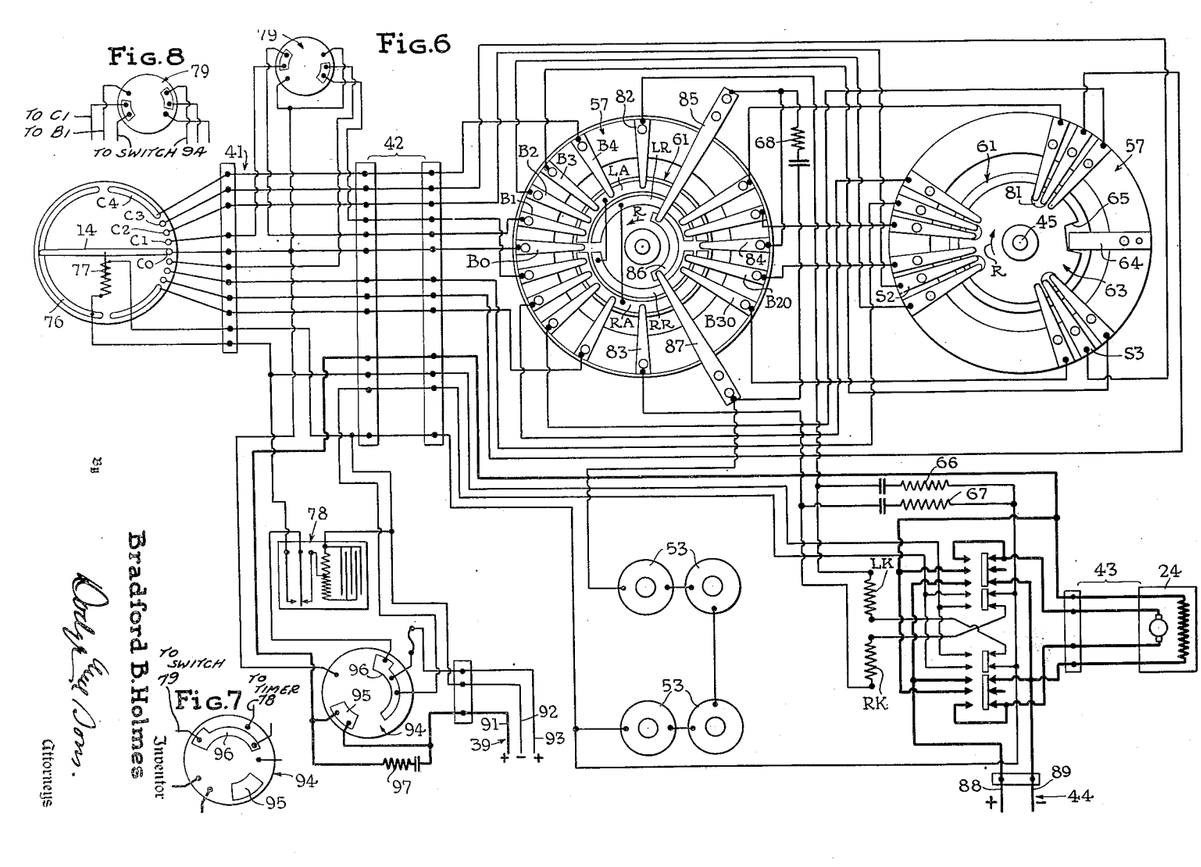
Fig. 6 is a circuit diagram of the steering mechanism. This diagram shows the preferred arrangement in which all control circuits are operated at low voltage (say 12 volts), and the steering motor is operated at the ship's voltage, whatever that may be (usually materially higher than 12 volts). The control switch is diagrammed in "automatic" position and the sensitivity switch in normal sensitivity position. In this view it is necessary to diagram the opposite faces of the contact disc, so the directions of its rotation appear to be reversed as indicated by the arrows marked R and indicating the rotation to apply right rudder.
Fig. 7 is a diagram of the control switch in "off" position.
Fig. 8 is a diagram of the sensitivity switch in low sensitivity position.

On Fig. 6, circuits at ship's voltage are diagrammed in heavier lines than the control circuits. The part indicated by the legend "remote control" on Fig. 1 is not a part of the present invention and is not diagrammed in Fig. 6.

Figures 1, 5:
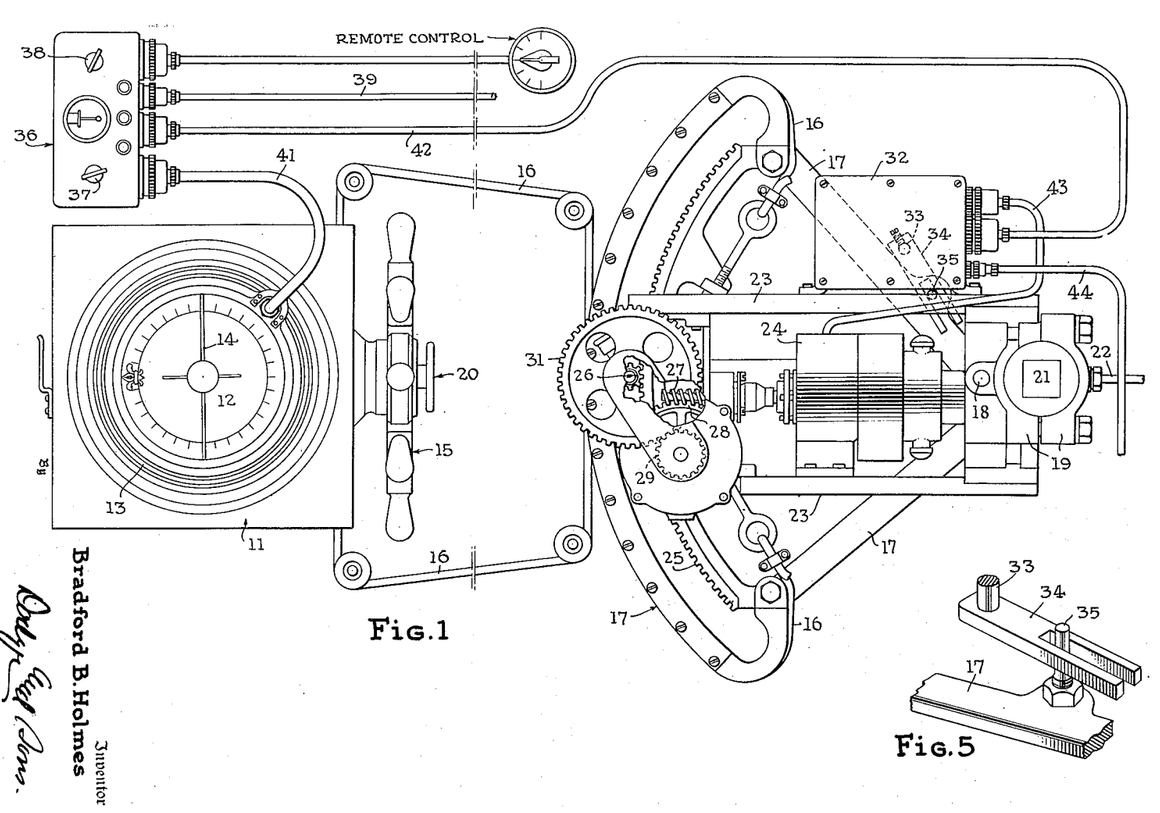
Fig. 1 is a plan view of the essential elements of a steering system with the invention applied, and the parts in normal neutral position.
Fig. 5 is a perspective fragmentary view of the pin and slot connection used to provide a variable ratio characteristic for the drive between the rudder post and the contact disc of the controller.
Figure 2:
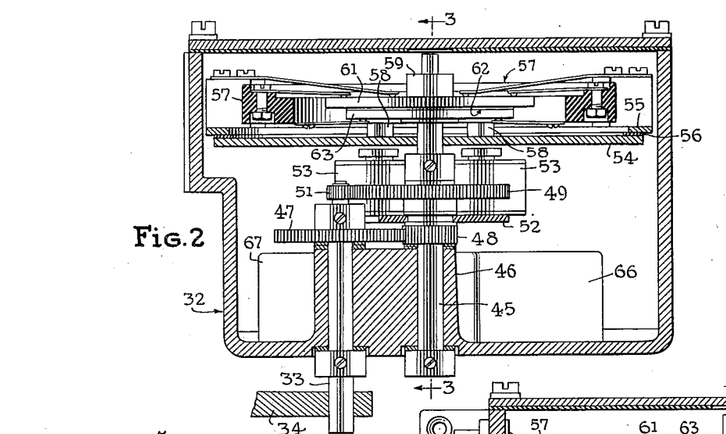
Fig. 2 is a vertical transverse section through the controller on the line 2—2 of Fig. 3.

Refer first to Fig. 1. A combined binnacle and wheel-stand 11 supports a magnetic compass whose card appears at 12 with course selector head 13 mounted in coactive relation with the compass and capable of being oriented thereon to set the course which is to be steered. While any suitable equivalent could be substituted, I prefer and illustrate a controller according to my Patent 1,993,548, issued March 5, 1935. So far as is here material, the compass positions a contact bar 14 and which is periodically lifted and dropped so as to close and open circuits through downward presented contacts arranged in arcuate series in a horizontal plane. These contacts will be discussed with reference to Fig. 6. The bar is moved to circuit-closing position about once per second.

Figure 9:
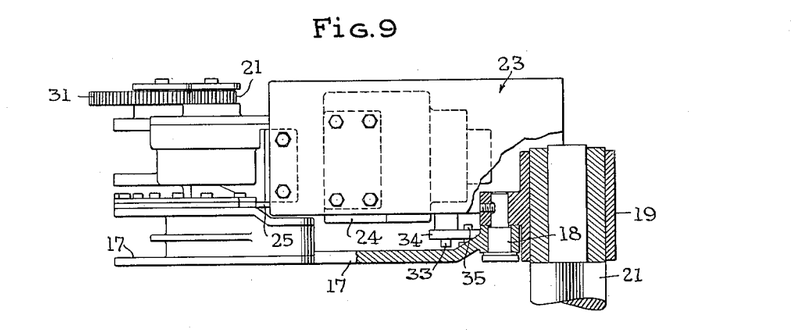
Figs. 9 is a side elevation of the quadrant and the tiller-frame with the related mechanism. The upper portion of the rudder post is shown in section.
Figure 11:
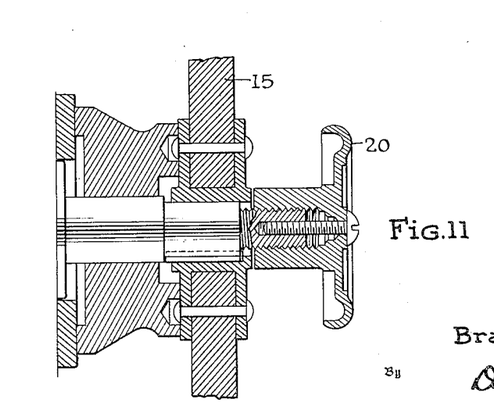
Fig. 11 is an axial section through the frictional clamping mechanism which may be used to hold the steering wheel fixed.

The stand 11 carries a steering wheel 15, which is connected by cables 16 with a quadrant 17. The wheel 15 may be frictionally held by applying a friction brake which is actuated by turning the small wheel 20. One possible arrangement for which no novelty is here claimed is shown in Fig. 11. The steering wheel 15 is splined on its shaft and the knob 20 is threaded on the same shaft and operates as a nut thereon, the thread being right-handed. When the wheel 20 is turned to the right, the wheel 15 is forced into frictional engagement with the stand and thus held impositively against rotation. Any equivalent arrangement could be adopted. The quadrant is hinged at 18 on an axis parallel with the axis of the rudder post to a yoke 19 fixed on the upper end of the rudder post 21. See particularly Figs. 1, 5 and 9. A portion of the rudder appears at 22. A rectangular tiller-frame 23 is fixed to head 19 and carries a reversible direct current motor 24 which is the steering motor. It is chosen to operate with current at the voltage available on the craft. The motor is shunt wound and during automatic steering its field is continuously excited. Two magnetic relay switches, interlocked electrically so that only one can be energized at a time, control the armature circuit in such a way that selective energization of the relays and consequent closure of circuits through the front contacts of the energized relay will cause the motor to run in reverse directions. When both relays are deenergized the armature is short circuited through the back contacts of the relays. This affords dynamic braking, prevents the motor from over-running and gives precise rudder movements.

Figure 3:
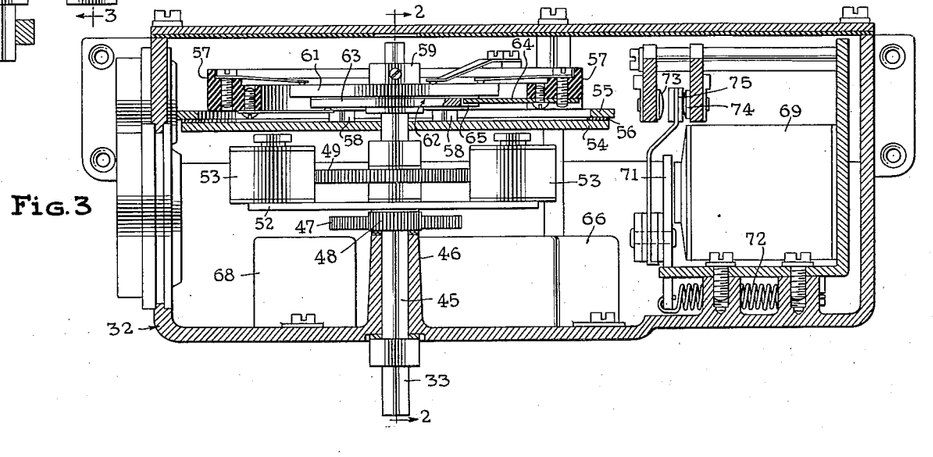
Fig. 3 is a vertical longitudinal section through the controller on the line 3—3 of Fig. 2.
Figure 4:
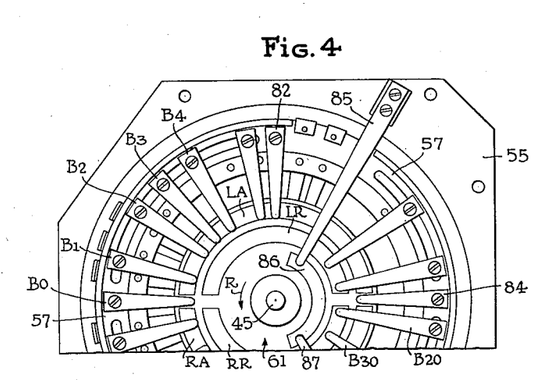
Fig. 4 is a plan view of the supporting plate, the brush-carrying ring which is rotatable through a small angle to change the corrected neutral position, and the contact disc which is driven by the rudder post and performs the follow up function in conjunction with brushes carried by said ring. In this view adjustable mounting of certain of the brushes is indicated, and one extra (unconnected) brush is shown adjacent brush 82. It may be used for purposes not here material.

The relays and connections will later be described by reference to Figs. 3 and 6.

The quadrant 17 carries an arcuate rack 25 centered on the axis of hinge 18 and tiller frame 23 carries a pinion 26 meshing therewith. A reduction train comprising worm 27, worm-wheel 28, pinion 29 and gear 31 drives pinion 26 from motor 24. The gear ratios and motor speed are so coordinated that the rudder is moved about 6° of angle per second. This value is typical but not critical.

Since the motion of the rudder in automatic steering corresponds with the swing of tiller frame 23 relatively to quadrant 17, it is desirable to mount the housing 32 of the controller on one of these parts and connect the actuating shaft 33 of the controller with the other. In the example illustrated, the housing 32 is fixed to the side of tiller frame 23 and shaft 33 carries fixed to it, a slotted arm 34 which coacts with a pin 35 fixed in a side arm of quadrant 17. (See Figs. 1, 5 and 9.) The pin is confined in the slot in arm 34 with very slight lateral clearance and the parts are so arranged that when the rudder 22 is in its centered (normal neutral) position and wheel 15 is in its rudder centering position, the center line of the slot passes through the axes of hinge 18 and shaft 33.

As a consequence of this arrangement, the shaft 33 turns at a variable rate relatively to tiller 23 and rudder 22. At the illustrated mid-position shaft 33 turns at a higher angular rate than does the rudder, but the disparity diminishes similarly as the rudder is displaced in either direction, so that at the maximum rudder displacement used in automatic steering (about 35°) the shaft 33 turns more slowly. The purpose is to facilitate close control near the neutral or mid-position of the controller.

In Fig. 1 a switch box and instrument panel is shown at 36. The knob of the controlling switch, hereinafter described, is shown at 37 and that of the sensitivity switch at 38. The cable 39 supplies low voltage current (12 volt) and current at ship's voltage. The multiple conductor cable 41 connects the compass head contacts with components in the switch box and with the multiple conductor cable 42 which leads from the switch box to the controller. The multiple conductor cable 43 connects the controller relay switches with the motor 24. The cable 44 supplies ship's current for the motor through the relay switches. The cables 39, 41, 42, 43 and 44 will be similarly identified on the circuit diagram Fig. 6. As indicated in Fig. 1 these cables terminate in multiple connection plugs, so that the various units can readily be disconnected for replacement or repair.

The controller will now be described as to its mechanical aspects. Refer to Figs. 2 to 5 inclusive.

The shaft 33 and a parallel shaft 45 turn in bearings formed in a boss 46 in the housing 32. Shaft 33 drives shaft 45 at 2.5 times its own angular velocity through the gears 47 and 48. A gear 49 is journaled to turn freely on shaft 45 and is driven by a pinion 51 on shaft 33, the ratio being such that gear 49 turns at ⅙ the angular velocity of shaft 33 and consequently at 1/15 the angular velocity of shaft 45, and in the same direction as shaft 45.

The motion ratios above stated are typical and not critical. As used, shaft 45 turns at nearly 4 times the angular rate of tiller 23, when the tiller is at or near the mid-position shown in Fig. 1. If motor 24 displaces the rudder 22 by 35° the shaft 45 must turn something less than 90° and in this embodiment turns 80°, the relative rate of turn of the shaft diminishing as the rudder displacement increases.

The hub of gear 49 carries a plate 52 on which are mounted four electro-magnets 53, symmetrically distributed about shaft 45 and with their pole pieces spaced slightly below a combined clutch and brake disc 54 which is of iron and axially shiftable on shaft 45. A plate 55 is fixed in housing 32 and has an aperture centered on the axis of shaft 45 and somewhat smaller than disc 54. The disc has around its margin a brake facing 56 which engages the lower face of plate 55.

Normally the disc 54 is held yieldingly in its braking position by the reaction of the brushes hereinafter described, but if magnets 53 be energized it is drawn down against the pole pieces so that it is clutched to shaft 45 and freed of braking restraint.

It is this clutch-brake mechanism which makes the centering adjustment by which the corrected neutral position of the rudder is established. It does so, because the contactor elements (hereinafter called "brushes") of the follow up switch mechanism are carried by an insulator-ring 57 which is rigidly connected by lugs 58 with the clutch-brake disc 54. Minute rotary shifts of the disc 54 produced by brief clutching actions, afford desired corrections of the positions of all brushes carried by the ring.

Fixed to shaft 45 by hub 59 is the contact disc 61 which is the main moving (rotating) component of the follow up switch. Beneath disc 61 and journaled in the lower end of hub 59 is a second disc 63 which serves as the moving element of a change-over switch. This connects selectively certain brushes carried by ring 57. Disc 63 has a friction facing at 62 and this engages the lower face of disc 61 under the resilient urge of the brushes, so that disc 63 tends to turn with disc 61. Disc 63 can partake only of the initial motion in each of the two opposite directions since further motion is prevented by a stop finger 64 carried by ring 57 and entering notch 65 in the disc 63. (See Figs. 3 and 6.)

The parts 66, 67 and 68 shown on Fig. 6 are spark suppressors. They are also visible in Figs. 2 and 3 since they are enclosed in the controller housing 32.

Also in housing 32 are the two motor controlling relays identified on Fig. 6 as LK and RK. One relay, which is of conventional form, is illustrated in Fig. 3. The winding appears at 69, the armature at 71, the biasing spring at 72, one of the five back contacts at 73, one of the five front contacts at 74 and one of the two contactors at 75. The arrangement of the contacts and contactors is diagrammed in Fig. 6.

Before proceeding with a description of the diagrams in Figs. 6, 7 and 8, the nature of the diagram will be explained to forestall possible misconceptions.

Figure 10:
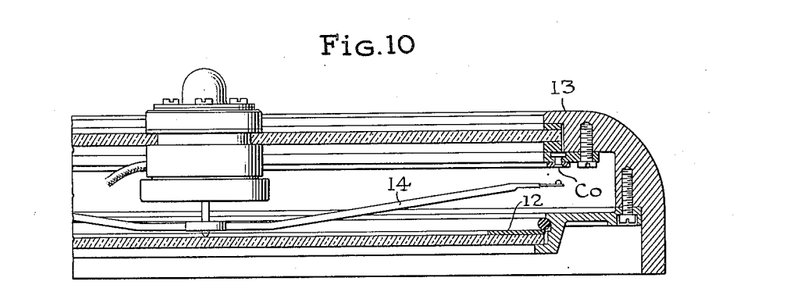
Fig. 10 is a fragmentary axial section through the selector head.

The selector head 13 is not shown in detail, but the general arrangement of parts including the location of the contact bar 14 below the arc of contacts is indicated in Fig. 10. The contacts C0, C1, C2, C3 and C4 are positioned in Fig. 6 as they would appear in plan. It should be understood that the contact bar 14 is beneath these contacts and moves upward to engage them, as indicated in Fig. 10. It is assumed that the craft is moving to the left with reference to Fig. 6. Consequently if the craft should depart from its course to its right, the bar 14 would move from the contact C0 to the contact C1 and then to the contact C2 and so on. These control application of left rudder.

The diagram shows at midlength the top face of the ring 57 and the top face of the disc 61, but the disc diagrammed in the upper right-hand corner of the view is the bottom of the disc 63, the bottom of the disc 61 and the bottom of the ring 57. The direction of rotation of the disc during the application of right rudder or removal of left rudder is indicated by an arrow R. These arrows are oppositely directed in the two parts of the diagram just mentioned, as they must be to indicate rotation in the same sense. It is assumed that the discs 61, 63, as shown in the upper right-hand corner, have been reversed by rotation about the horizontal diameter, as viewed in Fig. 6.

Since the automatic steerer operates in two reverse phases, one of which corrects departures from course to the right and the other of which corrects departures from course to the left, the contacts in the selector head, the contacts on the discs 61, 63 and the contactors or brushes on the brush ring 57 are located symmetrically with reference to a diameter in each case and in Fig. 6 the axes of symmetry are the horizontal diameters. If an attempt were made to apply reference numerals to every brush and every contact, the result would be considerable confusion. To avoid this it seems expedient to number only one of the two sets of contacts, brushes, etc. It will be understood that, with minor exceptions, those contacts and brushes which are lettered are the ones which function to apply and later remove left rudder.

In the selector head there is a centering contact C0. On each side of this centering contact are oppositely arranged series of successive increment contacts. The first increment of left rudder is controlled by C1, the second by C2, the third by C3 and the fourth by C4. The bar 14, when it rises, connects a contact 76, which is connected to the 12 volt positive line by means hereinafter described, with selected contacts such as those just mentioned. The bar 14 is lifted and lowered by the alternate energization and de-energization of a solenoid 77. This function is controlled by a timer generally indicated by numeral 78 and preferably constructed according to the disclosure of my Patent 2,080,273, issued May 11, 1937. It is arranged to operate at the rate of about one cycle per second. Any functionally equivalent timer might be substituted as far as the present invention is concerned.

The centering contact C0 is directly connected to the centering brush B0. The first increment contact C1 is normally directly connected with the first increment brush B1. The sensitivity switch 79 may on occasion be set at the position diagrammed in Fig. 8, in which event the brush B1 is dead and the contacts C0 and C1 are connected together and to B0. This comment also applies to the right rudder analog of C1 and B1.

The second increment contact C2 is not connected directly to the second increment brush B2, but is connected to the selector contact S2, associated with selector switch disc 63. The disc 63, which is of di-electric material, has four identical silver inserts 81. The shift of disc 63 relatively to disc 61 establishes connection from S2 selectively through side brushes on opposite sides of S2, to the application limiting brush B2, or to the removal limiting brush B20. The purpose of this is to permit the brush B2 to be set to stop the application of rudder at any desired point and to set the brush B20 independently to stop the removal of rudder at the same or some different point. This gives contact C2 independently adjustable characteristics in applying and in removing rudder.

The third increment contact C3 is connected through the selector contact S3 with either the brush B3 which terminates application of rudder or the brush B30 which terminates removal of rudder. These brushes also are adjustable for the purposes just mentioned.

The contact C4 never functions to terminate removal of rudder and therefore is connected directly with the brush B4.

In the upper face of the disc 61 are four arcuate silver contacts. The contact LA subtends a little less than 180°. The designation LA is intended to suggest left application. The contact RA (right application) also subtends a little less than 180° and the two contacts LA and RA lie in a circle with diametrically opposed gaps or intervals between their ends.

There are similarly arranged concentric rudder-removal contacts, a right removal contact RR and a left removal contact LR. Since the motor turns in the same direction to apply right rudder as to remove left rudder, the contacts LR and RA are cross-connected as shown in the diagram. For the same reason, RR and LA are cross-connected. The gaps in the two sets of arcuate contacts aline. A brush 82 connects LA and consequently also RR with one terminal of the winding of the left relay LK. The brush 83 connects RA and LR with one terminal of the winding of the right relay RK. It should be observed that the opposite terminals of the windings of these two relays are cross-connected each to a back contact of the other relay, so that if either relay is energized, the other can not be.

A brush 84 mounted on the ring 57 diametrically opposite the brush B0 lies in the gap between the contacts LA and RA when the system is centered. It is the means which energizes the magnets 53 at the start and only at the start of a rudder application. Such a start commences with the system centered. If the controller then moves in either direction, brush 84 will engage either LA or RA and energize the brush 85 which is not mounted on the ring 57 but is mounted on a portion of the fixed plate 55. (See Fig. 4.) From there the circuit is through an arcuate contact 86 on the disc 61 and from this contact through brush 87 to the electromagnets 53. Slight rotation of disc 61 in either direction will move contact 86 clear of brush 85 or brush 87. Thus, at the start of a rudder application, the magnets 53 will be energized, but only very briefly, and will turn the ring 57 in the direction in which the controller shaft 45 is turning.

It should be remembered that this occurs near the neutral point at a time when the shaft 45 turns nearly four times as fast as the rudder. The disc 61 turns 15 times as fast as do the clutch magnets. It follows that the ring 57 will be shifted by an amount approximating ¼ or ⅓ of one degree. From this it follows that the adjustment of the ring 57 produced by the clutch magnets 53 is minute and can take place only at the start of a rudder application.

Furthermore, the adjustment of the ring 57 shifts the position of the brush 84 with reference to the brushes 85 and 87. The parts are so dimensioned that when the ring has been displaced about 18° one of the brushes 85 or 87 will be beyond the end of the contact 86. Thus, when a 5° rudder correction has been accumulated, the correcting function is suspended.

The supply connections for electric current are diagrammed clearly and it is believed that reliance can be placed on the circuit diagram of Fig. 6 without attempting to identify every wire that is shown.

At the lower right-hand corner of Fig. 6, the supply cable 44 is diagrammed. This supplies ship's current which may be assumed to be at 110 volts. The positive line is indicated at 88 and the negative line at 89. Similarly the three-conductor cable 39 contains a positive connection 91 at ship's voltage, the negative 12 volt connection 92 and the positive 12 volt connection 93. Ship's voltage conductors are diagrammed with heavier lines than are 12 volt conductors.

In Fig. 6 the switch 94 is shown in position for automatic steering. It is shown in position to cut off all electrical steering in Fig. 7.

Under automatic steering conditions as diagrammed in Fig. 6, the cable 44 supplies the ship's current for operating the motor when the relay is energized, but the contactor 95 closes a circuit through the field of the motor and maintains it closed constantly. It is protected by spark suppressor 97 located in the switch box 36. The low voltage circuits extend through the selector head and the controller and energize the windings of the relays LK and RK selectively. As one or the other is closed, the armature of the motor is operated in relatively reverse directions. The contact 96 in the switch 94 establishes in automatic position energization of the timer and the control circuits.

In the "off" position Fig. 7, switch 94 connects the centering contact B0 to the positive line 93 of the low voltage circuit. It is this connection which causes the steerer to return to centered position if the switch 94 is turned to "off" position.

*Operation*

The end of bar 14 is so formed that it may engage a single contact or two adjacent contacts.

Assume first that it closes against the centering contact C0 while the switches 79 and 94 are set as shown in Fig. 6. The closure is of course intermittent. As long as the brush B0 is in contact with neither LA nor RA nothing happens. The craft is on course.

Next suppose that the bar 14 engages C0 and C1 simultaneously. This will close a circuit from 76 through C1, B1, LA and 82 to the winding of the relay LK. This will start the motor 24 running to apply left rudder. The two front contacts engaged by the short contactor in the relay will establish a holding circuit which maintains the contact bar 14 up continuously. Thus the relay remains energized and the motor continues to run until the gap between LA and RA arrives beneath the brush B1. When it does, the circuit to the relay is broken, the relay opens and the motor stops instantly because it is dynamically braked. Arm 14 is now released by opening of the holding circuit. A second or two later the bar 14 may again close against C0 and C1, but at this time B0 is on RA while B1 is in the gap. The effect is to energize the other relay RK, run the motor in the reverse direction and remove the rudder which was applied in the preceding cycle. The motor is stopped when the gap moves under B0. In this way the rudder may be given a number of successive similar impulses, the rudder being applied with the full first increment and then removed without waiting for the craft to respond to the rudder. This is very effective in nudging the craft back onto her course without a swing of sufficient magnitude to cause her to turn back past the course. Usually one or two impulses only are needed to restore the course. Each impulse will energize the magnets 53 and produce a slight corrective adjustment of the brush ring 57 so that if the departure off course is caused by a change of external conditions, the corrective action is commenced at once.

Now suppose that the craft makes a sharper departure from course and that the contactor closes against C1 and only C1. This would occur on a wider departure from course. The relay would close and remain closed until the gap between RA and LA arrives under brush B1. The motor would then stop. The effect of this application of rudder will ultimately be to start the craft swinging toward its course, so that the contactor 14 would soon close against the contact C0. This would occur before the ship was on course and would start the motor in operation to remove the rudder. At this stage impulse steering might resume.

Suppose now that the boat makes quite a sharp departure from course, so that contactor 14 closes against C2. This would energize brush B2 or B20, depending on the condition of S2, but in either event the relay LK would close and start the motor to apply left rudder. Control would then be shifted to B2 by contactor S2, unless that condition already existed. The motor would continue to run applying left rudder until the gap between LA and RA arrived under the brush B2, whereupon the relay would open and the motor stop. This would leave RA under the brush B1, so that if the craft started to turn back toward the course and contactor 14 closed against C1, the motor would run to remove rudder, and the selector S2 would shift control to B20. The motor would stop when the gap between LR and RR arrived under the brush B20. Observe that B2 determines the point at which application of rudder will stop, but the termination of removal of rudder is controlled by B20.

One might reasonably inquire what would happen if contactor 14 closed against C1 and C2 simultaneously. It can do so. The motor would run until the gap between LA and RA arrived at B2 and then stop. If the contactor 14 then again closed against C1 and C2, rudder would be removed until the circuit was broken at B1. However, as a practical matter, this type of impulse steering practically never occurs for the reason that if the craft has swung far enough for the contactor 14 to reach C2, the swing will be so rapid that the same two contacts will not be engaged a second successive cycle of the contactor 14. However, an impulse between B1 and B2, or B2 and B3, or B3 and B4, has substantially the same effect as a rudder angle set midway between them. While only four contacts on a side are used, they give the equivalent of eight steps. It follows that impulse steering occurs for departures from course not exceeding about 3° and follow up steering is had for larger departures.

As already explained, the ability to adjust brushes, such as B20 and B30 independently of the adjustment of brushes such as B2 and B3, permits a given automatic steering mechanism to be adapted to the characteristics of a wide variety of ships. Whenever the rudder is started from the neutral position, there is a slight adjustment of the brush ring 57 in the same direction. When the departures from course become numerically equal in the two directions, the corrected neutral position has been established and will not be changed until the balance is destroyed as it might be by freshening wind or as a consequence of a changed course, changed speed or changed trim, to name the more important possibilities.

The switch 79 is carried in the position shown in Fig. 6 under all normal conditions. If the craft starts to wallow as a ship may do in a quartering or following sea, it is desirable to suppress automatic steering within the range of the wallow or false yaw. This is accomplished by shifting the switch 79 to the position shown in Fig. 8. Contact C1 and the similar contact adjacent C0 on the opposite side are connected together and become in effect a single centering contact. Brush B1 and the symmetrically arranged brush on the other side of brush B0 are disconnected. The effect is to suppress automatic steering within the range of the false yaw, without changing the degree of corrective rudder produced by contacts C2, C3 or C4 or the three similar contacts at the other side of C0.

Consequently, while the effect of the switch 79 is to change sensitivity, it does not modify the response of those contacts which remain active. The effect is simply to suppress automatic operations which would be futile, and which would consume power and wear out the apparatus needlessly.

When the control switch 94 is turned to the position shown in Fig. 7, it interrupts the connection to the positive ship's circuit at 91 and connects the centering contact B0 to the 12 volt line independently of the selector head. As a consequence, the contact B0 takes control and closes the relays selectively to run the motor in a corrective direction until the controller centers, at which time the brush B0 will be in the gap between RA and LA.

Under the conditions just mentioned, the motor field is not continuously energized, so that dynamic braking does not occur. On the first pass, the motor might coast far enough to carry the gap (between LA and RA) past the centering brush B0. However, this over-travel will be slight and the immediate reverse motion of the motor which will be caused by the over-travel will probably center the steerer. In any case, the gear will hunt to the neutral position in diminishing movements back and forth.

While the preferred embodiment of the invention has been described in detail, this embodiment is illustrative only. The invention is not limited to a particular embodiment, and its scope is defined solely by the claims.

What is claimed is:

1. The method of steering on a predetermined substantially straight course, a dirigible craft having a rudder, which method consists in correcting deviations from course by sustained rudder action in which a corrective rudder increment proportioned to the deviation is applied, is maintained until the craft starts to swing toward the course and is later removed while the craft is still swinging toward the course; establishing a variable corrected neutral position for the rudder, by shifting said neutral position for each rudder application, and in the direction thereof, by a fixed minute angle; and suspending said minute shifts when a definite maximum total correction is attained in either direction.

2. The method of steering on a predetermined substantially straight course, a dirigible craft having a rudder, which method consists in correcting minor deviations from course by impulse steering in which one or a series of similar corrective rudder impulses are produced by applying a substantial rudder increment and removing the same before the craft returns to course; correcting major deviations from course by sustained rudder action in which a corrective rudder increment proportioned to the deviation is applied, is maintained until the craft starts to swing toward the course and is later removed while the craft is still swinging toward the course; establishing a variable corrected neutral position for the rudder, by shifting said neutral position for each rudder application, and in the direction thereof, by a fixed minute angle; and suspending said minute shifts when a definite maximum total correction is attained in either direction.

3. In an automatic steering device, the combination of a rudder having a neutral position; a rudder-actuating motor operable to turn the rudder in either direction from and toward said neutral position; a control head having a directionally controlled element arranged to establish selectively a plurality of circuits for operating said motor to turn the rudder in each of its two directions from said neutral position and back thereto; follow-up means comprising a part driven by said rudder and having pairs of motor-controlling circuit interrupters, there being a pair for each of several of said circuits; and selector means rendered effective by reversal of motion of the rudder and serving to interpose the interrupting means of the various pairs selectively in their respective circuits, according as the rudder is moving from or is returning toward said neutral position.

4. The combination defined in claim 3, in which at least one of the circuit interrupters of each pair is adjustable to change the point in the motion of the motor at which interruption occurs.

5. The combination defined in claim 3 in which both of the circuit interrupters of each pair are adjustable to change the points in the motion of the motor at which interruption occurs.

6. The combination defined in claim 3 in which the follow-up means comprises a movable part with elongated contacts, each engaged simultaneously by a series of brushes which interrupt respective circuits as they clear the end of said contact and said brushes are adjustable individually in the direction of the lengths of said contacts.

7. In an automatic steering device, the combination of a reversible, rudder-actuating motor having a neutral position; a control head having a directionally controlled element arranged to establish selectively a plurality of circuits for operating said motor in each of its two directions from said neutral position and back thereto; follow-up means comprising a part driven by said motor and having pairs of motor-stopping circuit interrupters, there being a pair for each of several of said circuits; and selector means rendered effective by reversal of motion of the motor and serving to interpose the interrupting means of the various pairs selectively in their respective circuits, according as the motor is moving from or is returning toward said neutral position.

8. The combination defined in claim 7 in which at least one of the circuit interrupters of each pair is adjustable to change the point in the motion of the motor at which interruption occurs.

9. The combination defined in claim 7 in which both of the circuit interrupters of each pair are adjustable to change the points in the motion of the motor at which interruption occurs.

10. The combination defined in claim 7 in which the follow-up means comprises a movable part with elongated contacts, each engaged simultaneously by a series of brushes which interrupt respective circuits as they clear the end of said contact and said brushes are adjustable individually in the direction of the lengths of said contacts.

11. In an automatic steering device, the combination of a reversible, rudder-actuating motor having a neutral position; a control head having a directionally controlled element arranged to establish selectively a plurality of circuits for operating said motor in each of its two directions from said neutral position and back thereto; follow-up means comprising a contact-carrying member driven by the motor, a brush support adjustable in a path adjacent the path of said contact-carrying member, and brushes carried by said support and coacting with contacts on said member, there being at least one of said brushes interposed in such circuit controlled by said head, one of said brushes being a centering brush which normally serves to stop the motor in its neutral position and the other brushes serving to stop the motor at points appropriate to the corresponding circuits; brake means normally holding said support against adjustment; magnetic clutch means which when energized release said brake and clutch said support in driven relation to said motor whereby the support is adjusted; and contacts arranged to energize said clutch means as the motor starts to move from said neutral position, and through a definite range of motor movement, which range is a fractional part of the minimum motion of the motor under control of the control head.

12. In an automatic steering device, the combination of a reversible, rudder-actuating motor having a neutral position; a control head having a directionally controlled element arranged to establish selectively a plurality of circuits for operating said motor in each of its two directions from said neutral position and back thereto; follow-up means comprising a contact-carrying member driven by the motor, a brush support adjustable in a path adjacent the path of said contact-carrying member, and brushes carried by said support and coacting with contacts on said member, there being at least one of said brushes interposed in such circuit controlled by said head, one of said brushes being a centering brush which normally serves to stop the motor in its neutral position and the other brushes serving to stop the motor at points appropriate to the corresponding circuits; brake means normally holding said support against adjustment; magnetic clutch means which when energized release said brake and clutch said support in driven relation to said motor whereby the support is adjusted; contacts arranged to energize said clutch means as the motor starts to move from said neutral position, and through a definite range of motor movement, which range is a fractional part of the minimum motion of the motor under control of the control head; and contacts also controlling energization of said magnetic clutch means and serving to limit the cumulative adjustment of said support in each direction.

13. In an automatic steering device, the combination of a rudder having a neutral position; a rudder-actuating motor operable to move the rudder in either direction; a control head having a directionally controlled element arranged to establish selectively a plurality of circuits for causing the motor to operate the rudder in each of its two directions from said neutral position and back thereto; follow-up means comprising a contact-carrying member driven with the rudder, and a plurality of brushes coacting therewith, there being at least one of said brushes interposed in each circuit controlled by said control head, one of said brushes being a centering brush which normally serves to stop the rudder in its neutral position, and the other brushes serving to stop the rudder at points appropriate to the corresponding circuits; and a control switch having at least two positions, in one of which it energizes the control head, and in the other of which it deenergizes the control head and energizes the centering brush of the follow-up means.

14. In an automatic steering device, the combination of a reversible, rudder-actuating motor having a neutral position; a control head having a directionally controlled element arranged to establish selectively a plurality of circuits for operating said motor in each of its two directions from said neutral position and back thereto; follow-up means comprising a contact-carrying member driven by the motor, and a plurality of brushes coacting therewith, there being at least one of said brushes interposed in each circuit controlled by said control head, one of said brushes being a centering brush which normally serves to stop the motor in its neutral position, and the other brushes serving to stop the motor at points appropriate to the corresponding circuits; and a control switch having at least two positions, in one of which it energizes the control head, and in the other of which it deenergizes the control head and energizes the centering brush of the follow-up means.

15. In an automatic steering device, the combination of a rudder having a neutral position; a rudder-actuating motor operable to turn the rudder in either direction from and toward said neutral position; a control head comprising a centering contact and first increment contacts, one at each side of the centering contact and a directionally controlled contactor operable to close against individual contacts and also to close simultaneously against the centering contact and either of said first increment contacts, such closure serving to exercise primary control of circuits which cause said rudder-actuating motor to move the rudder in relatively opposite directions; follow-up means comprising a part driven by said motor, moving with said rudder and having two alined contacts for respectively exercising secondary control on the circuits primarily controlled by the control head, there being an interval between said contacts, said follow-up means further comprising a centering brush connected with the centering contact in the control head and first increment brushes connected each with a respective first increment contact in the control head; and means for moving said contactor periodically to and from its contacting position, the parts being so arranged that movement of the follow-up contacts interrupts and interchanges said circuits whereby repeated closure of the contractor against the same two contacts causes the motor to move the rudder to apply and then move the rudder to remove a definite increment of rudder.

16. The combination of a dirigible craft having a rudder characterized by a neutral position; a controller responsive to direction, and settable to establish a course; power actuating means for said rudder controlled by said controller and serving upon departure of the craft from the established course to move the rudder from its neutral position in a corrective direction in a series of increments while said departure continues and then when the craft starts to swing toward said course to move the rudder back to neutral position in a series of decrements so timed as to end before the craft has returned to course; and two independent adjusting means included in said power actuating means, the first of which may be set to predetermine said increments, and the second of which may be set to predetermine said decrements.

BRADFORD B. HOLMES.

REFERENCES CITED

The following references are of record in the file of this patent:

UNITED STATES PATENTS

| Number | Name | Date |
| --- | --- | --- |
| 1,993,551 | Holmes | Mar. 5, 1935 |